(12) United States Patent
Shao et al.

(10) Patent No.: US 10,796,069 B1
(45) Date of Patent: Oct. 6, 2020

(54) BUMP CONNECTION PLACEMENT IN QUANTUM DEVICES IN A FLIP CHIP CONFIGURATION

(71) Applicant: International Business Machines Corporation, Armonk, NY (US)

(72) Inventors: Dongbing Shao, Wappingers Falls, NY (US); Markus Brink, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/433,253

(22) Filed: Jun. 6, 2019

(51) Int. Cl.
| | |
|---|---|
| G06F 17/50 | (2006.01) |
| H01L 23/00 | (2006.01) |
| G06F 30/398 | (2020.01) |
| H01L 23/498 | (2006.01) |
| G06F 30/327 | (2020.01) |
| G06F 30/392 | (2020.01) |
| G06F 30/394 | (2020.01) |
| G06F 30/39 | (2020.01) |
| G06F 30/3308 | (2020.01) |

(Continued)

(52) U.S. Cl.
CPC ......... G06F 30/398 (2020.01); G06F 30/327 (2020.01); G06F 30/39 (2020.01); G06F 30/392 (2020.01); G06F 30/394 (2020.01); H01L 23/49811 (2013.01); H01L 23/49838 (2013.01); H01L 24/06 (2013.01); H01L 24/10 (2013.01); H01L 24/14 (2013.01); G06F 30/30 (2020.01); G06F 30/337 (2020.01); G06F 30/3308 (2020.01); G06F 2111/12 (2020.01); G06F 2111/14 (2020.01); G06F 2113/18 (2020.01); G06F 2115/12 (2020.01); H01L 2225/06513 (2013.01)

(58) Field of Classification Search
None
See application file for complete search history.

(56) References Cited

U.S. PATENT DOCUMENTS

| 6,627,999 B2 | 9/2003 | Akram et al. |
|---|---|---|
| 6,952,814 B2 | 10/2005 | Joseph et al. |

(Continued)

OTHER PUBLICATIONS

R. N. Das et al., "Cryogenic Qubit Integration for Quantum Computing," 2018 IEEE 68th Electronic Components and Technology Conference, pp. 504-514. (Year: 2018).*

Primary Examiner — Leigh M Garbowski
(74) Attorney, Agent, or Firm — Garg Law Firm, PLLC; Rakesh Garg; Keivan Razavi

(57) ABSTRACT

Within a layout of a first surface in a flip chip configuration, a bump restriction area is mapped according to a set of bump placement restrictions, wherein a first bump placement restriction specifies an allowed distance range between a bump and a qubit chip element in a layout of the first surface, and wherein a second bump placement restriction specifies an allowed distance range between the bump and a qubit chip element in a layout of a second surface in the flip chip configuration. An electrically conductive material is deposited outside the bump restriction area, to form the bump, wherein the bump comprises an electrically conductive structure that electrically couples a signal between the first surface and the second surface and is positioned according to the set of bump placement restrictions.

20 Claims, 11 Drawing Sheets

(51) Int. Cl.

| | |
|---|---|
| G06F 30/30 | (2020.01) |
| G06F 30/337 | (2020.01) |
| G06F 111/12 | (2020.01) |
| G06F 113/18 | (2020.01) |
| G06F 115/12 | (2020.01) |
| G06F 111/14 | (2020.01) |

(56) References Cited

U.S. PATENT DOCUMENTS

| | | |
|---|---|---|
| 7,943,967 B2 | 5/2011 | Becker et al. |
| 8,826,203 B2 | 9/2014 | Darringer et al. |
| 9,361,424 B2 | 6/2016 | Robles |
| 9,589,092 B2 | 3/2017 | Fang et al. |
| 2003/0102159 A1 | 6/2003 | Loo |
| 2006/0123363 A1 | 6/2006 | Williams et al. |
| 2017/0017742 A1 | 1/2017 | Oberg et al. |
| 2019/0096798 A1 | 3/2019 | Aleksov et al. |
| 2019/0171973 A1 | 6/2019 | Shao et al. |
| 2020/0012961 A1* | 1/2020 | Kelly .................. H01L 39/14 |

* cited by examiner

BUMP CONNECTION PLACEMENT IN QUANTUM DEVICES IN A FLIP CHIP CONFIGURATION

TECHNICAL FIELD

The present invention relates generally to a method, system, and computer program product for element placement in quantum devices. More particularly, the present invention relates to a method, system, and computer program product for bump connection placement in quantum devices in a flip chip configuration.

BACKGROUND

Hereinafter, a "Q" prefix in a word or phrase is indicative of a reference of that word or phrase in a quantum computing context unless expressly distinguished where used.

Molecules and subatomic particles follow the laws of quantum mechanics, a branch of physics that explores how the physical world works at a fundamental level. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

Superconducting devices such as qubits are fabricated using superconducting and semiconductor materials in known semiconductor fabrication techniques. A superconducting device generally uses one or more layers of different materials to implement the device properties and function. A layer of material can be superconductive, conductive, semiconductive, insulating, resistive, inductive, capacitive, or have any number of other properties. Different layers of materials may have to be formed using different methods, given the nature of the material, the shape, size or placement of the material, other materials adjacent to the material, and many other considerations.

Superconducting devices are often planar, i.e., where the superconductor structures are fabricated on one plane. A non-planar device is a three-dimensional (3D) device where some of the structures are formed above or below a given plane of fabrication.

A q-processor is implemented as a set of more than one qubit. The qubits are fabricated as a lattice of co-planar devices on a single fabrication plane.

Superconducting qubit architectures typically arrange a number of qubits in a lattice formation in a single plane. The qubits are coupled with each other using resonant lines (also known as "bus"). The quantum state of a qubit is read using read lines.

All resonant lines are coplanar (in the same plane) with the qubits. As a result, qubits which lie in an inside, non-peripheral region of the lattice formation must be accessed orthogonally to the plane of fabrication of the lattice. A non-peripheral region or area of a lattice is an area located inside a perimeter of the lattice. This manner of accessing an interior qubit for modifying or reading the qubit's quantum state is known as "breaking the plane". Because breaking the plane can result in performance degradation in quantum processors and increase in the complexity of superconducting quantum circuits, quantum device implementations require careful design considerations when breaking the plane.

As the number of qubits in a quantum device increases, it becomes harder to arrange the qubits without breaking the plane to access an interior qubit. For example, a sixteen-qubit device can have its qubits arranged in two parallel rows of eight qubits each, with no interior qubits. However, a 24-qubit device, with three parallel rows of eight qubits each coupled in a square lattice layout, does have an interior row of qubits which cannot be accessed within the circuit plane from the periphery of the arrangement. As well, simply increasing the length of two parallel rows (e.g. using two parallel rows of twelve qubits each) results in a quantum device with undesirable additional area and the additional complexity of connecting a qubit at one end of a row with a qubit at the other end of a row. In addition, such long runs of connections require extra qubit operations and give rise to an increased execution time of quantum algorithms.

SUMMARY

The illustrative embodiments provide a method, system, and computer program product. An embodiment includes a method that maps, within a layout of a first surface in a flip chip configuration, a bump restriction area according to a set of bump placement restrictions, wherein a first bump placement restriction specifies an allowed distance range between a bump and a qubit chip element in a layout of the first surface, and wherein a second bump placement restriction specifies an allowed distance range between the bump and a qubit chip element in a layout of a second surface in the flip chip configuration. An embodiment deposits an electrically conductive material, outside the bump restriction area, to form the bump, wherein the bump comprises an electrically conductive structure that electrically couples a signal between the first surface and the second surface and is positioned according to the set of bump placement restrictions.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
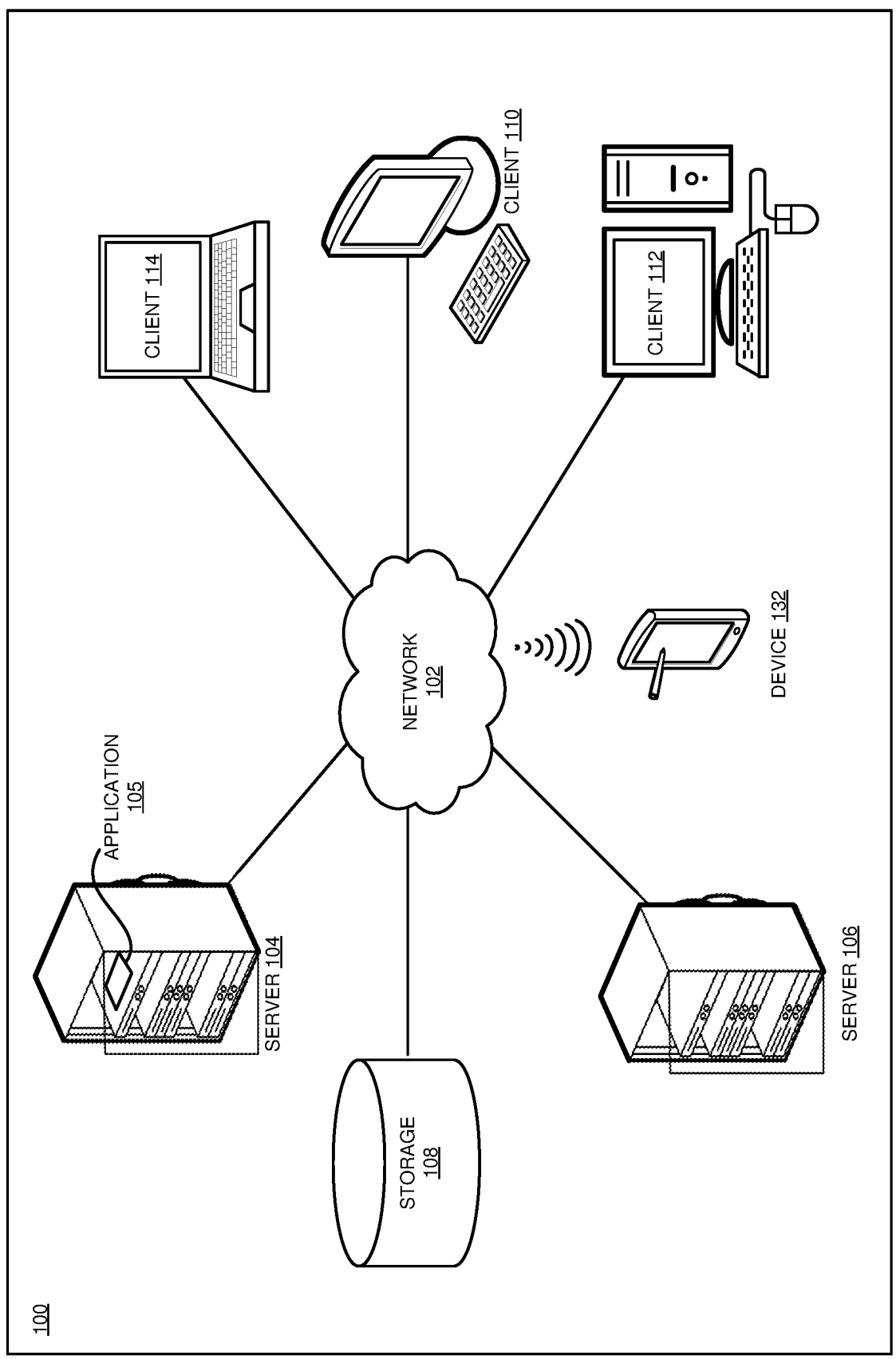
FIG. 1 depicts a block diagram of a network of data processing systems in which illustrative embodiments may be implemented.

An interior qubit is a qubit that is not located on a periphery of the configuration of qubits in a quantum device; in other words, a qubit that is situated in a physical location other than on the periphery of the configuration of qubits in a quantum device. The illustrative embodiments recognize that one solution for accessing interior qubits is to configure a quantum device in a flip chip configuration. A flip chip configuration, or simply a flip chip, interconnects a surface of a device or chip with another surface of a second chip, using bumps that have been deposited onto one or both surfaces, such that the two surfaces are parallel to each other and a bump on one surface is connected to a corresponding bump or surface location on the second surface. A bump is a conductive structure, formed in three dimensions over a two-dimensional surface, using at least an electrically conductive material, and in some cases a superconducting material. One property of a bump as contemplated herein is that the bump structure protrudes away from the two-dimensional surface in an orthogonal direction such that an electrical connection can be formed at the bump from the orthogonal direction.

Typically, the bottom surface of one chip is connected to the top surface of the second chip, but other arrangements are also possible and contemplated within the scope of the illustrative embodiments. In one embodiment, a height of the bump structure provides a desired amount of physical separation between the two surfaces.

In particular, in a quantum device flip chip configuration, one chip (e.g. the bottom chip) typically includes elements that enable qubit connectivity, such as qubits and bus resonators. The second chip (e.g. the top chip) typically includes input/output elements that enable readout of individual qubits, such as qubit readout circuitry and qubit write operations. Although herein one chip may be referred to for convenience as a bottom chip and another chip referred to as a top chip, and elements of a quantum device described with reference to one chip or another, or one surface of a chip or another, any element of a quantum device may be disposed on any surface of any chip in any orientation of one or both chips.

The bumps of a quantum device in a flip chip configuration connect the ground planes of each chip in the flip chip together, suppressing spurious electromagnetic modes and improving signal integrity. Although most bumps connect ground planes, some bumps may connect signals from one chip to another. Bumps also improve mechanical integrity of the flip chip package by helping to physically hold the two chips together. In one embodiment, a material used for forming a bump is selected according to not only the material's electrical characteristics but the material's mechanical characteristics, such as malleability and softness.

The illustrative embodiments recognize that, to maintain signal and ground plane integrity, there are restrictions on the placement of active elements on each facing surface in the flip chip and the bumps that connect the two surfaces. Circuit elements of a quantum device include qubits, resonators, filters, charge lines, busses, and other signal connection elements. Circuit elements on one surface must not contact, come in proximity of one another by less than a specified threshold separation distance, or overlap with circuit elements on the other surface. Bumps must be placed so as to be at least a particular distance from circuit elements on each surface being connected. Bump placement should be as uniform as possible across a surface, and there should be as many bumps as can be accommodated in a design. In other words, the bump-to-bump distances in a given area should be approximately equal, and the bump-to-bump distance in the area should be minimized while satisfying any design or fabrication constraints. Furthermore, each bump on one surface must align within a specified tolerance with a corresponding bump or location on the other surface, so that corresponding locations can be electrically coupled with each other using each bump. Such restrictions are typically assembled into a set of design rules governing a particular flip chip configuration.

The illustrative embodiments also recognize that, as the size of quantum devices increases, e.g., when a quantum device grows beyond a few tens of qubits, placing elements and bumps in the flip chip configuration without violating any of the set of design rules is too complex to be performed manually. Elements on one surface must be placed with reference to elements on the other surface. A bump on one surface must be aligned with a corresponding bump or location on the other surface. Moving one element or bump can necessitate the movement of other elements or bumps, and further necessitate the movement of additional elements or bumps, to meet different design rule restrictions. In addition, checking design rule conformity for a complex chip layout must be done in an automated manner; humans cannot recognize areas where there are insufficient bumps or a bump is placed too close to an element in the consistently error-free manner required for a robust device design. Consequently, the illustrative embodiments recognize that there is a need for automated element and bump placement, design rule conformity checking, and bump adjustment.

The illustrative embodiments recognize that the presently available tools or solutions do not address these needs or provide adequate solutions for these needs. The illustrative embodiments used to describe the invention generally address and solve the above-described problems and other problems related to bump connection placement in quantum devices in a flip chip configuration.

An embodiment can be implemented as a software application. The application implementing an embodiment can be configured as a modification of an existing quantum device design system, as a separate application that operates in conjunction with an existing quantum device design system, a standalone application, or some combination thereof.

Particularly, some illustrative embodiments provide a method that performs automated element and bump placement, design rule conformity checking, and bump adjustment.

An embodiment receives, as input, a design specification for a quantum device in a flip chip configuration. The design specification includes a number of qubits and connectivity requirements between qubits. Connectivity requirements are requirements for which qubits must be connected to which other qubits. Operations between qubits can only be performed on qubits that are connected to each other. As a result, although not all qubits in a quantum device are required to connect to each other, the more qubits that are connected to each other, the fewer additional operations are required to move information between qubits. For example, qubit connectivity might be considered sparse when one qubit communicates with only two other qubits. In another example, qubit connectivity might be considered dense when one qubit communicates with four or five or six other qubits.

From the number of qubits and connectivity requirements between qubits, an embodiment estimates a total area required to implement each surface of the eventual flip chip configuration. For example, if each qubit takes up one unit of area, a quantum device with fifty qubits will use less overall area than a quantum device with one hundred qubits. In addition, while denser connectivity can result in a more efficient quantum device, the additional connectivity also requires additional busses and additional chip area for the additional busses.

The design specification also includes bump information for the flip chip. Bump information includes the size (diameter within a surface plane and height above a surface plane) of each bump. Bump information also includes bump pitch, i.e. the center-to-center distance between a bump and an adjacent bump. The bump size and pitch specified for a particular flip chip depend on the size of elements in the quantum device, the precision with which elements and bumps can be placed on a flip chip surface, signal and ground integrity considerations, and other considerations. In one non-limiting example, one design specification specifies a 100 micron bump diameter and a 200 micron bump pitch, resulting in 300 to 600 bumps in a resulting flip chip depending on the total chip area.

An embodiment also receives, as input, several sets of design rules for a quantum device in a flip chip configuration. One set of design rules governs the placement of circuit elements on each surface of the flip chip. For example, this set of design rules might specify a minimum or maximum size for a particular element, a minimum separation between one element and another element or between an element of one type and an element of a different type and so on.

Another set of design rules governs the placement of elements on one surface of the flip chip relative to the placement of elements on the other surface of the flip chip. For example, this set of design rules might specify that an element on one surface must not overlap with an element on the other surface, or a minimum distance of an element on one surface from an element on the other surface.

A third set of design rules governs the relative placement of bumps and circuit elements on each surface of the flip chip. For example, this third set of design rules might specify that a bump must have a minimum distance from an element on either surface, or that a bump must have a minimum distance from one type of element and another minimum distance from another type of element.

Referencing the sets of design rules, an embodiment places all the required elements on one surface of the flip chip. Referencing the sets of design rules, the embodiment then places all the required elements on the opposite surface of the flip chip, ensuring that any rules regarding relative element placement are followed. In particular, one embodiment places all the qubit and coupling elements on the bottom chip, then places all the write and readout elements on the top chip, making sure that all design rules regarding element overlap and minimum distance are observed. Another embodiment places all the write and readout elements on the top chip, then places all the qubit and coupling elements on the bottom chip. Another embodiment interleaves element placement on each surface, rather than placing elements on one surface at a time.

Once all the elements on both surfaces have been placed, an embodiment places the bumps. An embodiment composites a layout of the elements on one flip chip surface with a layout of the elements on the other flip chip surface. Compositing, as used herein, is the combining of visual elements from separate sources into a single layout or images. Thus, the composite layout includes each element of both surfaces. Because no bump should touch a circuit element, in the composite layout an embodiment defines each area occupied by a circuit element as part of a bump restriction area. Because each bump should be separated by a minimum distance from each circuit element, in the composite layout an embodiment enlarges the bump restriction area by any applicable minimum distance. The minimum distance may vary depending on the type of element. For example, the minimum distance from a qubit may be larger than the minimum distance from a bus. One or more minimum distances are specified in the design rules governing the relative placement of bumps and elements. In addition, an embodiment adjusts the bump restriction area, enlarging or reducing the bump restriction area so that any resulting bumps will conform to any applicable design rules.

One embodiment places the bumps by overlaying a uniform tiling of bumps at a specified bump pitch with the composite layout, then removing any bumps that fall at least partially within the bump restriction area. In one embodiment, the tiling is orthogonal. In another embodiment, the tiling is non-orthogonal. An embodiment also remembers which bumps were removed, for possible reinstatement. This method results in a uniform bump pitch throughout the composite layout, which is desirable. However, because a bump that overlaps even partially with the bump restriction area is removed, the resulting composite layout may include fewer bumps than desired.

Another embodiment places the bumps by defining a bump placement area. The bump placement area includes all of the composite layout that is not in the bump restriction area. Then the embodiment places a uniformly-tiled set of bumps within the bump placement area. Because the bumps are placed in the defined bump placement area, there are no bumps that fall at least partially within the bump restriction area to create an overlap. However, because the bump placement area may include non-contiguous areas, bumps will be uniform within each area, but not necessarily uniform across the entire chip. As well, although bumps will not need to be removed, a portion of a bump placement area may be too small to contain a bump. Such an area without a bump is not desirable.

Once an embodiment has performed an initial bump placement, the embodiment checks that bump placement conforms to the sets of design rules. If a bump or element does not conform to the design rules, an embodiment adjusts a location of a bump or element, or adds or removes a bump, to produce a final composite layout that does conform to the design rules.

In particular, an embodiment checks for bumps that were removed for falling at least partially within the bump restriction area. A bump's overlap area is the area of the bump that is inside the bump restriction area divided by the total area of the bump, then optionally converted to a percentage. If a bump's overlap area is below an overlap threshold specified in the design rules, an embodiment reinstates the bump, but moves the bump, either in the x-direction, y-direction, or both, to a location where the bump no longer overlaps the bump restriction area. For example, if a bump's overlap area is 10 percent, and the overlap threshold specified in the design rules is 20 percent, an embodiment reinstates the bump, but adjusts the bump's location to a location where the bump no longer overlaps the bump restriction area.

An embodiment also checks the composite layout for an area without bumps, or with a number of bumps or a bump density (i.e. a number of bumps per unit area) below a threshold specified in the design rules. One embodiment searches the composite layout for an element pattern corresponding to a pattern likely to have a number of bumps or a bump density below a threshold specified in the design rules. For example, an island is a portion of ground plane that is electrically isolated from the remainder of the ground plane because the portion is not connected, or does not have sufficient connection, as specified in the design rules, to another portion of the ground plane. An island requires at least a threshold number of bumps or at least a threshold bump density to reliably form a connection to electrical ground. As another example, a tip is a narrow line of metal that, because of its shape, is too narrow to accommodate the at least a threshold number of bumps or at least a threshold bump density required to reliably connect the tip to electrical ground. Islands and tips are two non-limiting examples of types of areas, within a chip layout for a flip chip configuration, that could have a number of bumps or a bump density below a threshold specified in the design rules. Other types of areas are also possible and contemplated within the scope of the illustrative embodiments.

If an embodiment finds an area with a number of bumps or a bump density below a threshold specified in the design rules, an embodiment adjusts a location of a bump or element, or adds or removes a bump, to produce a final composite layout that does conform to the design rules. For example, if an element placement resulted in a portion of the bump placement area being too small to contain a sufficient number of bumps, an embodiment could move an element, either in the x-direction, y-direction, or both, to another location such that the resulting bump placement area no longer has a portion too small to contain a sufficient number of bumps.

If an embodiment adjusted a location of a bump or circuit element, or adds or removes a bump, an embodiment rechecks that the adjusted layout now conforms to the sets of design rules. If a bump or element still does not conform to the design rules, an embodiment repeats the adjustment and checking process until producing a final composite layout that does conform to the design rules.

The manner of bump connection placement in quantum devices in a flip chip configuration described herein is unavailable in the presently available methods in the technological field of endeavor pertaining to quantum device design systems. A method of an embodiment described herein, when implemented to execute on a device or data processing system, comprises substantial advancement of the functionality of that device or data processing system in performing automated element and bump placement, design rule conformity checking, and bump adjustment.

The illustrative embodiments are described with respect to certain types of surfaces, configurations, qubits, qubit connectivity elements, qubit readout elements, bumps, adjustments, insertions, removals, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
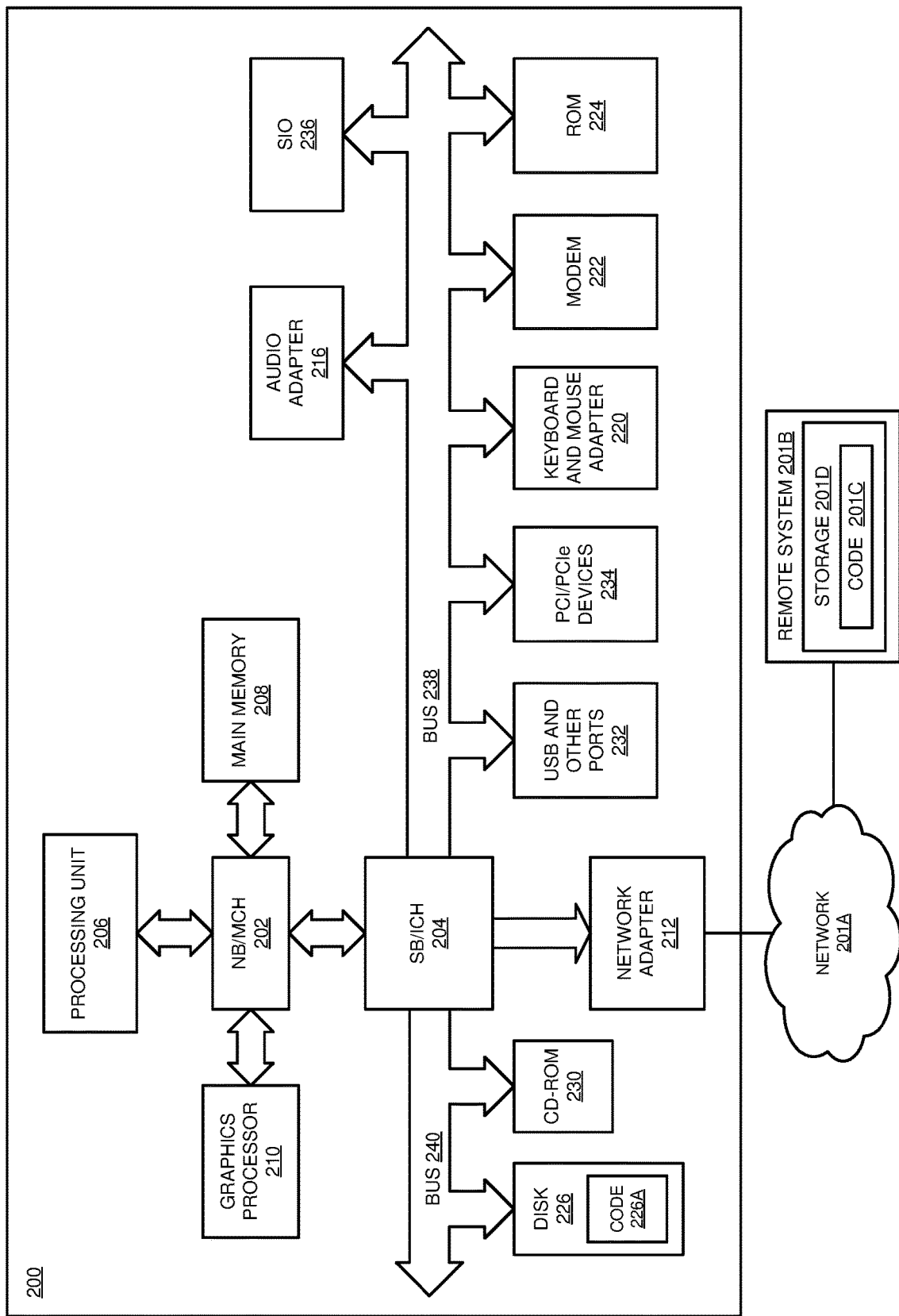
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
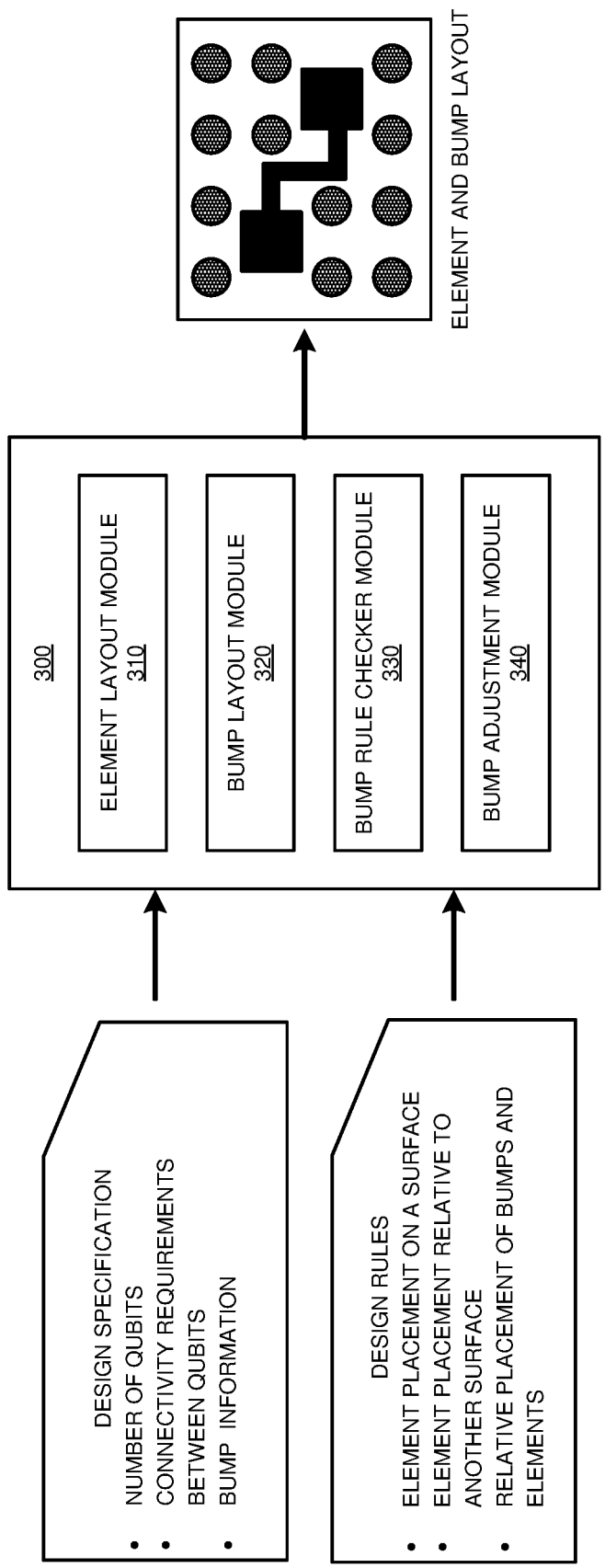
FIG. 3 depicts a block diagram of an example configuration for bump connection placement in quantum devices in a flip chip configuration in accordance with an illustrative embodiment.

With reference to FIG. 3, this figure depicts a block diagram of an example configuration for bump connection placement in quantum devices in a flip chip configuration in accordance with an illustrative embodiment. Application 300 is an example of application 105 in FIG. 1 and executes in any of servers 104 and 106, clients 110, 112, and 114, and device 132 in FIG. 1.

Application 300 receives, as input, a design specification for a quantum device in a flip chip configuration. The design specification includes a number of qubits and connectivity requirements between qubits. From the number of qubits and connectivity requirements between qubits, an embodiment estimates a total area required to implement each surface of the eventual flip chip configuration. Application 300 also receives, as input, several sets of design rules for a quantum device in a flip chip configuration. Referencing the sets of design rules, element layout module 310 places all the required elements on one surface of the flip chip. Referencing the sets of design rules, module 310 then places all the required elements on the opposite surface of the flip chip, ensuring that any rules regarding relative element placement are followed.

Once all the elements on both surfaces have been placed, bump layout module 320 places the bumps. In particular, module 320 composites a layout of the elements on one flip chip surface with a layout of the elements on the other flip chip surface. Because no bump should touch an element, in the composite layout module 320 defines each area occupied by an element as part of a bump restriction area. Because each bump should be separated by a minimum distance from each element, in the composite layout module 320 enlarges the bump restriction area by any applicable minimum distance. The minimum distance may vary depending on the type of element. For example, the minimum distance from a qubit may be larger than the minimum distance from a bus. One or more minimum distances are specified in the design rules governing the relative placement of bumps and elements. In addition, module 320 adjusts the bump restriction area, enlarging or reducing the bump restriction area so that any resulting bumps will conform to any applicable design rules.

In one implementation, module 320 places the bumps by overlaying a uniform tiling of bumps at a specified bump pitch with the composite layout, then removing any bumps that fall at least partially within the bump restriction area. Module 320 also remembers which bumps were removed, for possible reinstatement.

In another implementation, module 320 places the bumps by defining a bump placement area. The bump placement area includes all of the composite layout that is not in the bump restriction area. Then module 320 places a uniformly-tiled set of bumps within the bump placement area.

Once module 320 has performed an initial bump placement, bump rule checker module 330 checks that bump placement conforms to the sets of design rules. If a bump or element does not conform to the design rules, adjustment module 340 adjusts a location of a bump or element, or adds or removes a bump, to produce a final composite layout that does conform to the design rules.

Figure 4:
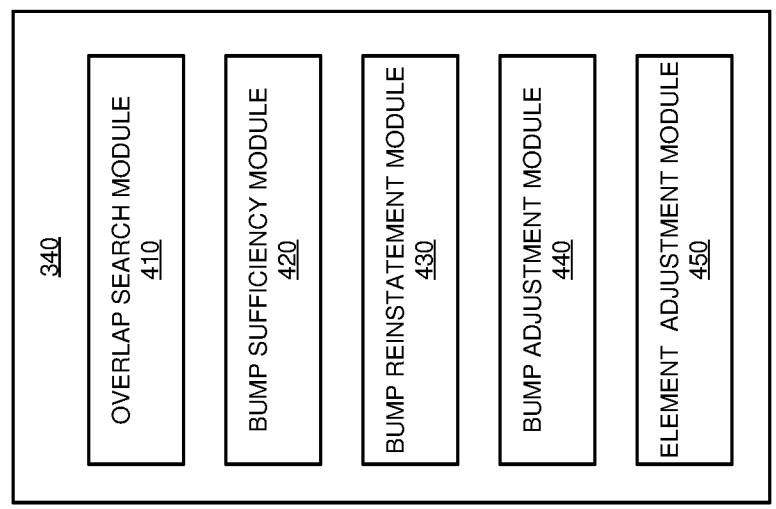
FIG. 4 depicts another block diagram of an example configuration for bump connection placement in quantum devices in a flip chip configuration in accordance with an illustrative embodiment.

With reference to FIG. 4, this figure depicts another block diagram of an example configuration for bump connection placement in quantum devices in a flip chip configuration in accordance with an illustrative embodiment. In particular, FIG. 4 depicts more detail of adjustment module 340 in FIG. 3.

Overlap search module 410 checks for bumps that were removed for falling at least partially within the bump restriction area. If a bump's overlap area is below an overlap threshold specified in the design rules, bump reinstatement module 430 reinstates the bump, but moves the bump, either in the x-direction, y-direction, or both, to a location where the bump no longer overlaps the bump restriction area.

Bump sufficiency module 420 also checks the composite layout for an area without bumps, or with a number of bumps or a bump density (i.e. a number of bumps per unit area) below a threshold specified in the design rules. In one implementation, module 420 searches the composite layout for an element pattern corresponding to a pattern likely to have a number of bumps or a bump density below a threshold specified in the design rules—for example, an island or a tip.

If module 420 finds an area with a number of bumps or a bump density below a threshold specified in the design rules, bump adjustment module 440 and element adjustment module 450 work together to adjust a location of a bump or element, or add or remove a bump, to produce a final composite layout that does conform to the design rules.

Figure 5:
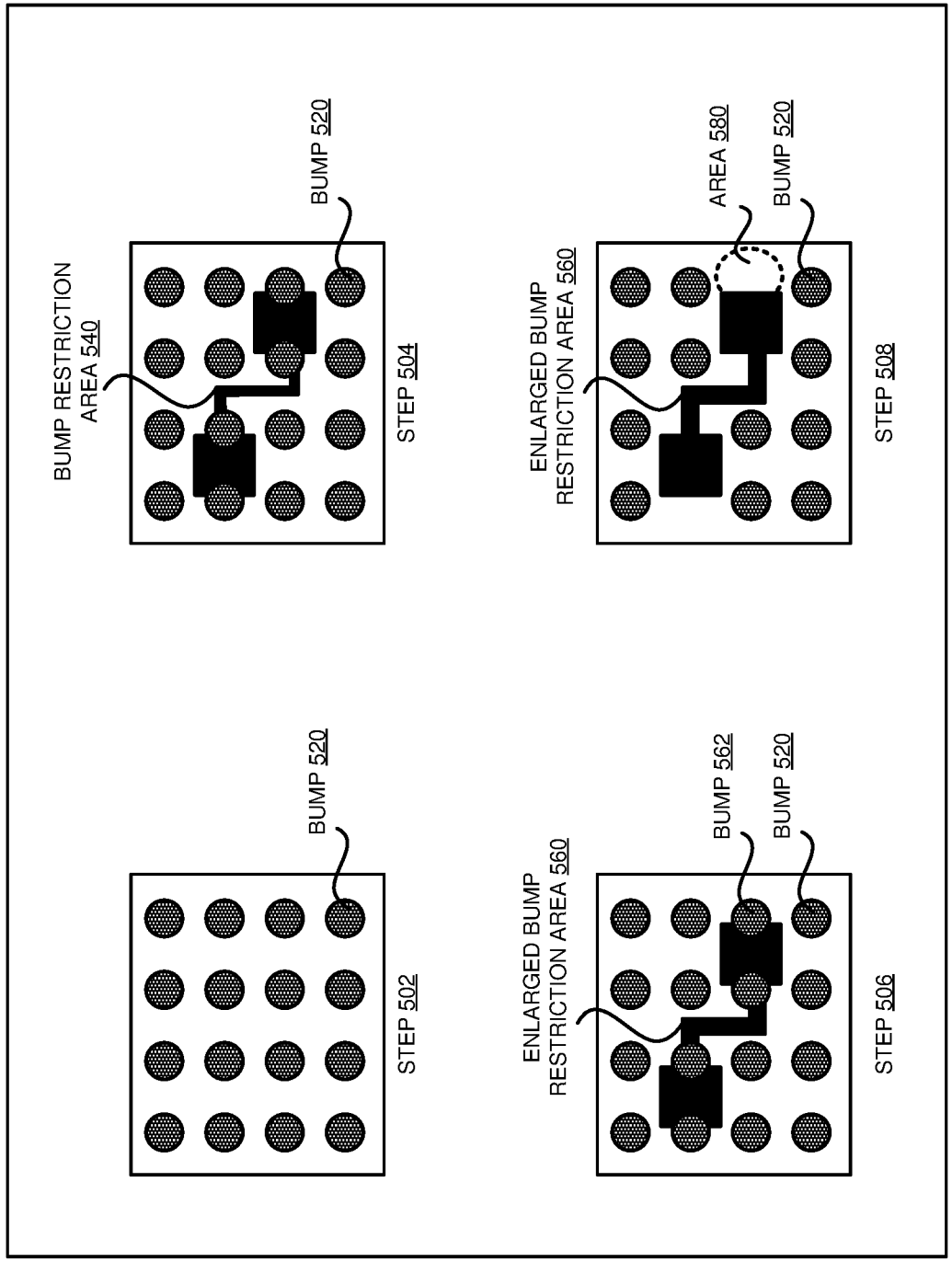
FIG. 5 depicts an example of bump connection placement in quantum devices in a flip chip configuration in accordance with an illustrative embodiment.

With reference to FIG. 5, this figure depicts an example of bump connection placement in quantum devices in a flip chip configuration in accordance with an illustrative embodiment. The example can be implemented using application 300 in FIG. 3.

In particular, FIG. 5 depicts steps in the bump placement performed by application 300. Step 502 depicts a uniform tiling of bumps, for example bump 520, at a specified bump pitch, ready for overlaying with a composite layout. Step 504 depicts the uniform tiling of bumps composited with bump restriction area 540—an already-composited layout of the elements on one flip chip surface with a layout of the elements on the other flip chip surface. Step 506 depicts the uniform tiling of bumps composited with enlarged bump restriction area 560, an enlargement of bump restriction area 540, to ensure that each bump is separated by a minimum distance from each element. As depicted, bump 562 partially overlaps enlarged bump restriction area 560, while bump 520 does not. Step 508 depicts the resulting layout after removing any bumps that fall at least partially within the now-enlarged bump restriction area—such as bump 562. As depicted, bump 562 is no longer present in area 580.

Figure 6:
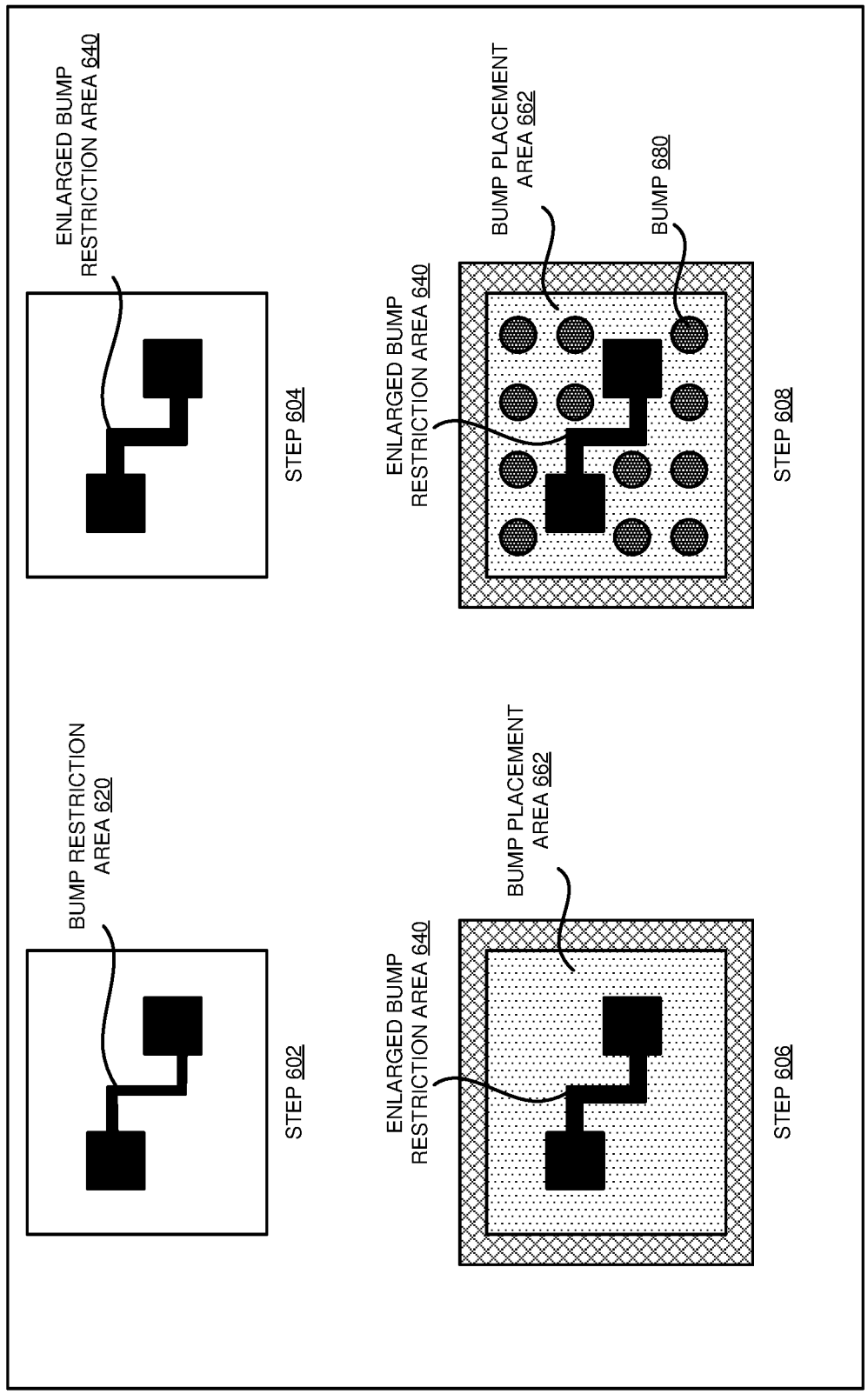
FIG. 6 depicts another example of bump connection placement in quantum devices in a flip chip configuration in accordance with an illustrative embodiment.

With reference to FIG. 6, this figure depicts another example of bump connection placement in quantum devices in a flip chip configuration in accordance with an illustrative embodiment. The example can be implemented using application 300 in FIG. 3.

In particular, FIG. 6 depicts steps in the bump placement performed by application 300. Step 602 depicts bump restriction area 620, defined by compositing a layout of the elements on one flip chip surface with a layout of the elements on the other flip chip surface. Step 604 depicts enlarged bump restriction area 640, an enlargement of bump restriction area 620, to ensure that each bump is separated by a minimum distance from each element. Step 606 depicts bump placement area 662, including all of the composite layout that is not in enlarged bump restriction area 640. Step 608 depicts a uniformly-tiled set of bumps, for example bump 680, within bump placement area 662. Because the bumps are placed within bump placement area 662, there are no bumps that fall at least partially within the bump restriction area to create an overlap.

Figure 7:
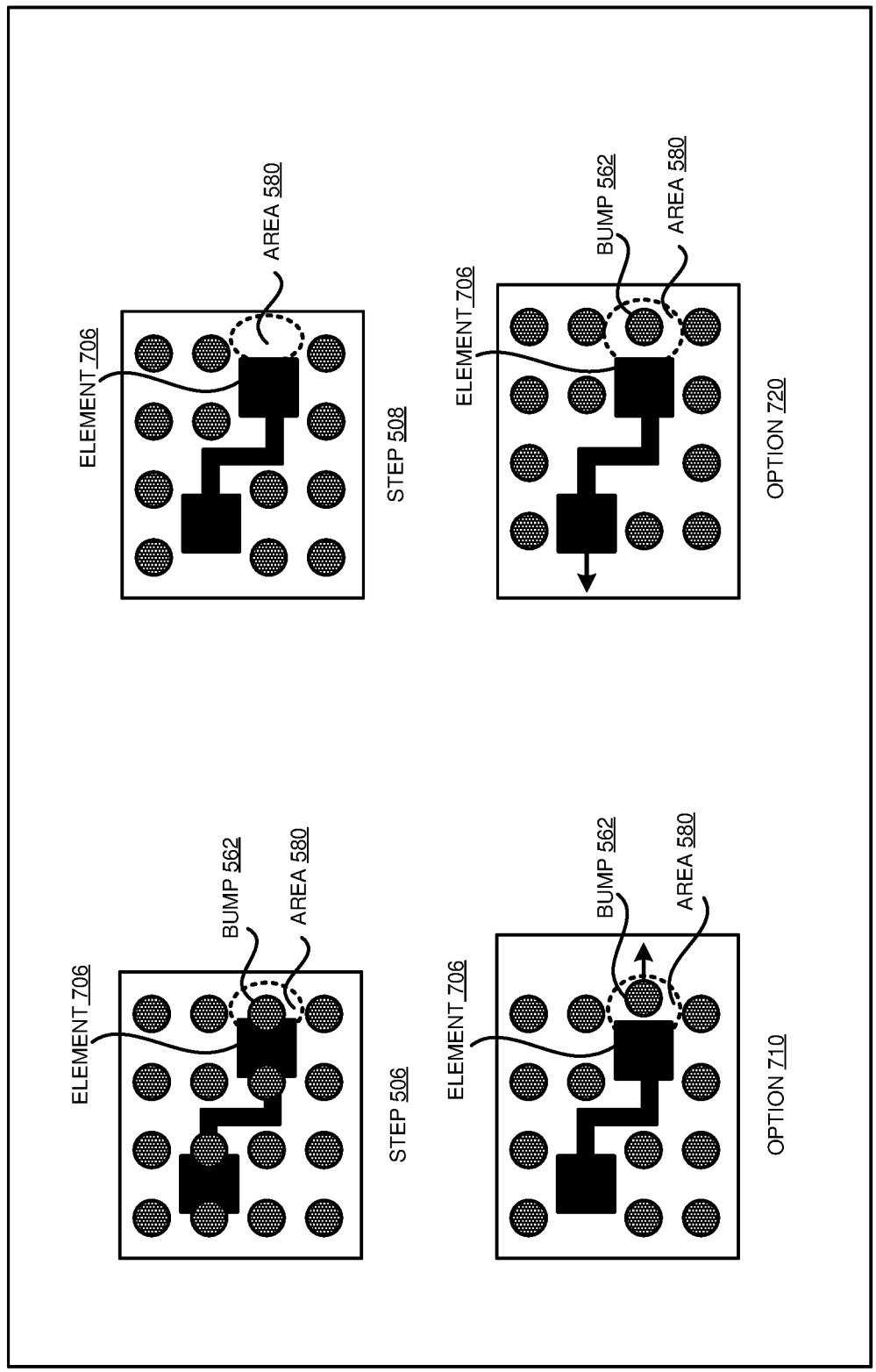
FIG. 7 depicts another example of bump connection placement in quantum devices in a flip chip configuration in accordance with an illustrative embodiment.

With reference to FIG. 7, this figure depicts another example of bump connection placement in quantum devices in a flip chip configuration in accordance with an illustrative embodiment. The example can be implemented using application 300 in FIG. 3. Steps 506 and 508, bump 562, and area 580 are the same as steps 506 and 508, bump 562, and area 580 in FIG. 5.

In particular, FIG. 7 depicts options for overlapping bump reinstatement performed by application 300. As depicted in step 506, bump 562, inside area 580, partially overlaps element 706 in enlarged bump restriction area 560. Step 508 depicts the resulting layout after removing any bumps that fall at least partially within the now-enlarged bump restriction area—such as bump 562. Thus, in step 508 bump 562 is no longer present in area 580.

Because bump 562's overlap area is below an overlap threshold specified in the design rules, the application reinstates bump 562, but moves bump 562, either in the x-direction, y-direction, or both, to a location where the bump no longer overlaps the bump restriction area. As a result, option 710 depicts bump 562 moved to the right. Alternatively, the application reinstates bump 562, but moves an element, such as element 706, either in the x-direction, y-direction, or both, to a location where bump 562 no longer overlaps the bump restriction area. As a result, option 720 depicts element 706 moved to the left. However, moving element 706 in option 720 necessitated the removal of an additional bump.

Figure 8:
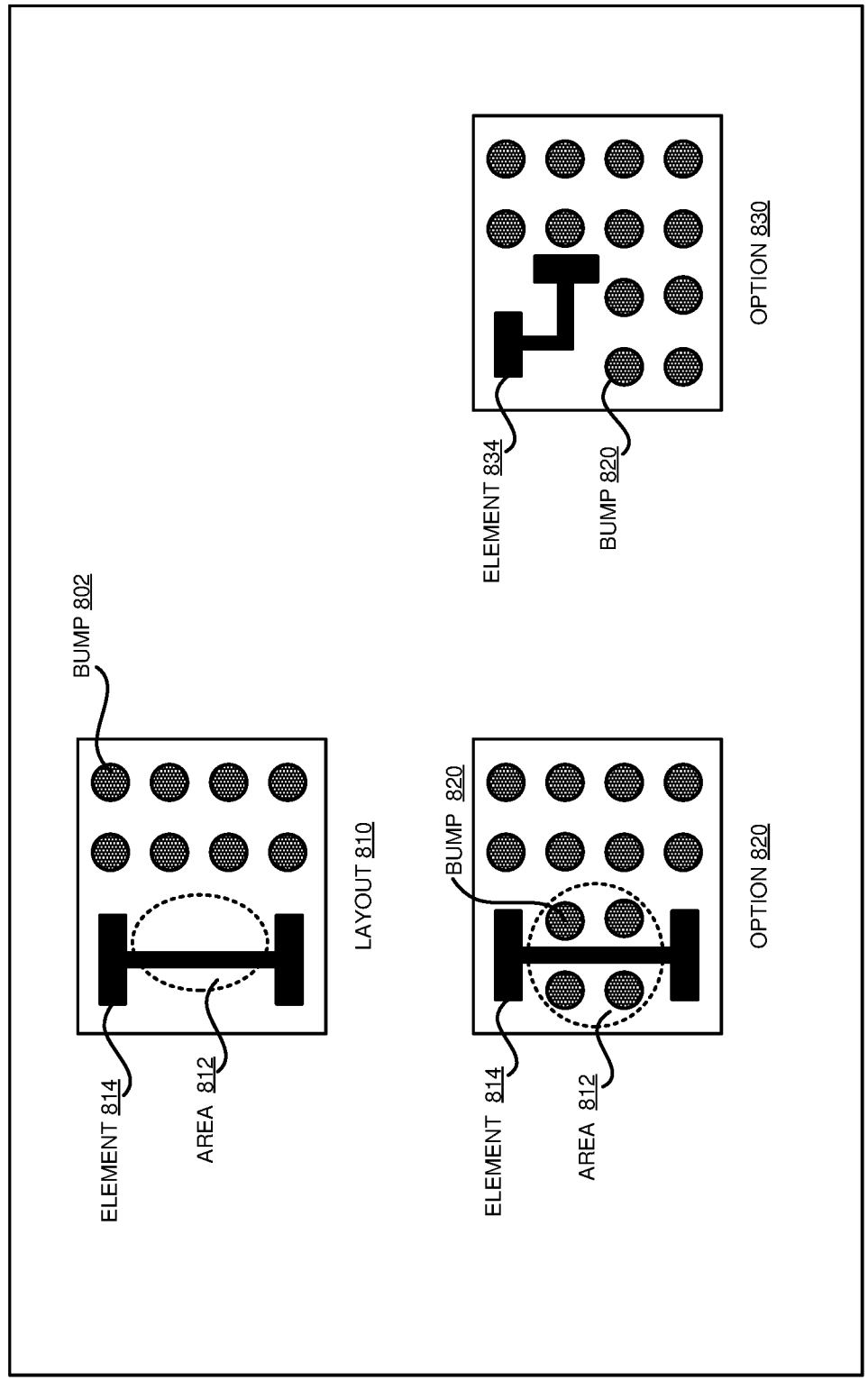
FIG. 8 depicts another example of bump connection placement in quantum devices in a flip chip configuration in accordance with an illustrative embodiment.

With reference to FIG. 8, this figure depicts another example of bump connection placement in quantum devices in a flip chip configuration in accordance with an illustrative embodiment. The example can be implemented using application 300 in FIG. 3.

In particular, FIG. 8 depicts options for resolving an area without bumps. In particular, in layout 810, bumps, such as bump 802, have been placed near element 814. However, the application has identified area 812 as an area without bumps. Thus, option 820 depicts bumps, such as bump 820, added in area 812. Similarly, option 820 depicts new element 834, a rearrangement of element 814 to occupy a smaller area. Additional bumps, such as bump 820, have been added to the area thus made available.

Figure 9:
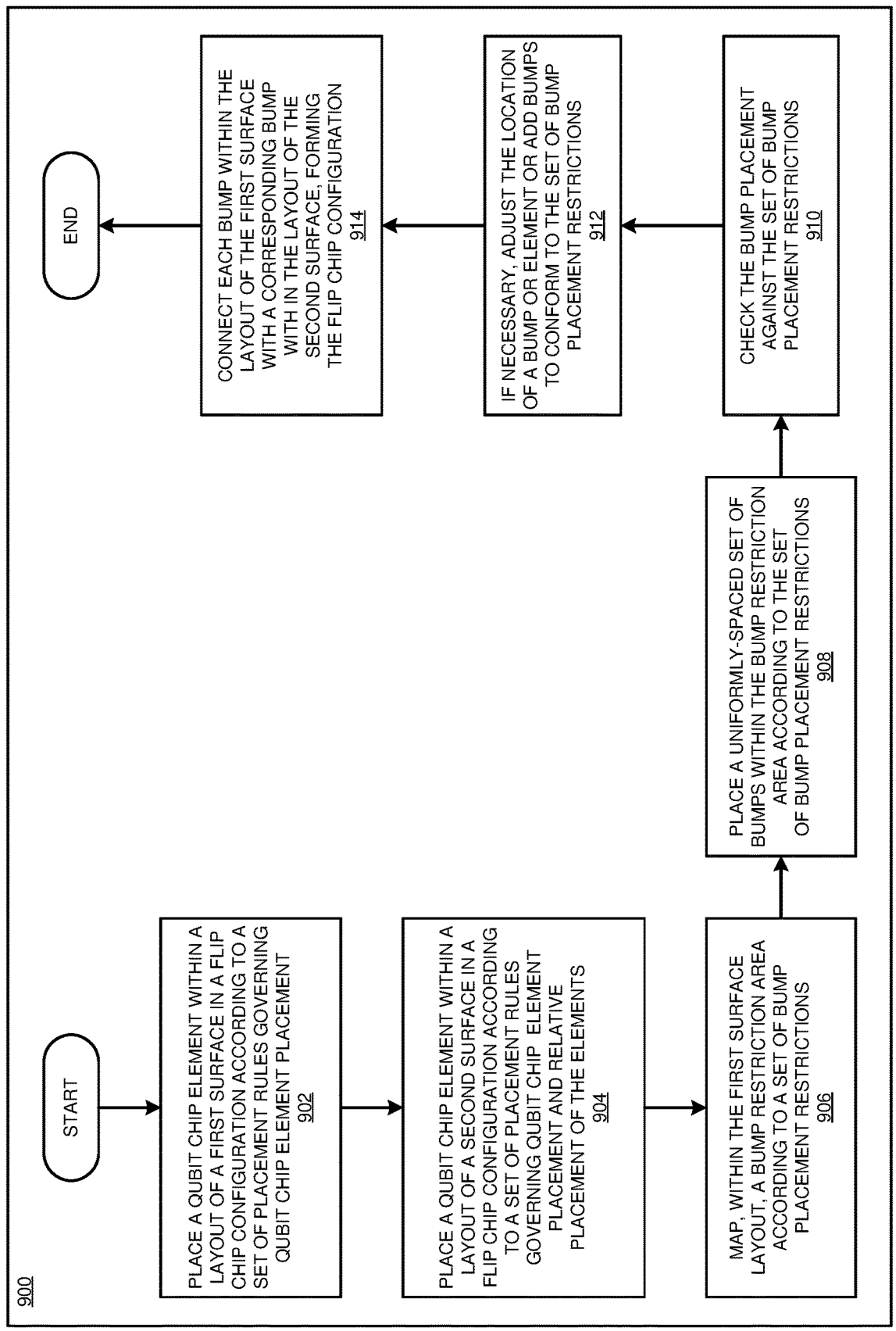
FIG. 9 depicts a flowchart of an example process for bump connection placement in quantum devices in a flip chip configuration in accordance with an illustrative embodiment.

With reference to FIG. 9, this figure depicts a flowchart of an example process for bump connection placement in quantum devices in a flip chip configuration in accordance with an illustrative embodiment. Process 900 can be implemented in application 300 in FIG. 3.

In block 902, the application places a qubit chip element within a layout of a first surface in a flip chip configuration according to a set of placement rules governing qubit chip element placement. In block 904, the application places a qubit chip element within a layout of a second surface in a flip chip configuration according to a set of placement rules governing qubit chip element placement and relative placement of the elements. In block 906, the application maps, within the first surface layout, a bump restriction area according to a set of bump placement restrictions. In block 908, the application places a uniformly-spaced set of bumps within the bump restriction area according to the set of bump placement restrictions. In block 910, the application checks the bump placement against the set of bump placement restrictions. In block 912, the application if necessary, adjusts the location of a bump or element or add bumps to conform to the set of bump placement restrictions. In block 914, the application connects each bump within the layout of the first surface with a corresponding bump within the layout of the second surface, forming the flip chip configuration. Then the application ends.

Figure 10:
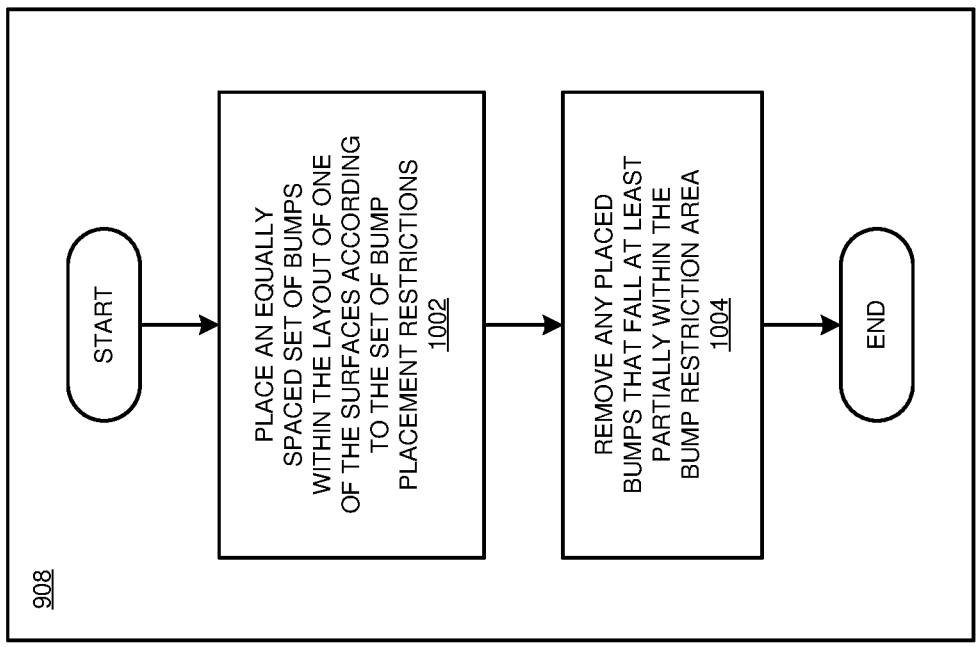
FIG. 10 depicts another flowchart of an example process for bump connection placement in quantum devices in a flip chip configuration in accordance with an illustrative embodiment.

With reference to FIG. 10, this figure depicts another flowchart of an example process for bump connection placement in quantum devices in a flip chip configuration in accordance with an illustrative embodiment. FIG. 10 depicts more detail of block 908 in FIG. 9.

In block 1002, the application places an equally spaced set of bumps within the layout of one of the surfaces according to the set of bump placement restrictions. In block 1004, the application removes any placed bumps that fall at least partially within the bump restriction area. Then the application ends.

Figure 11:
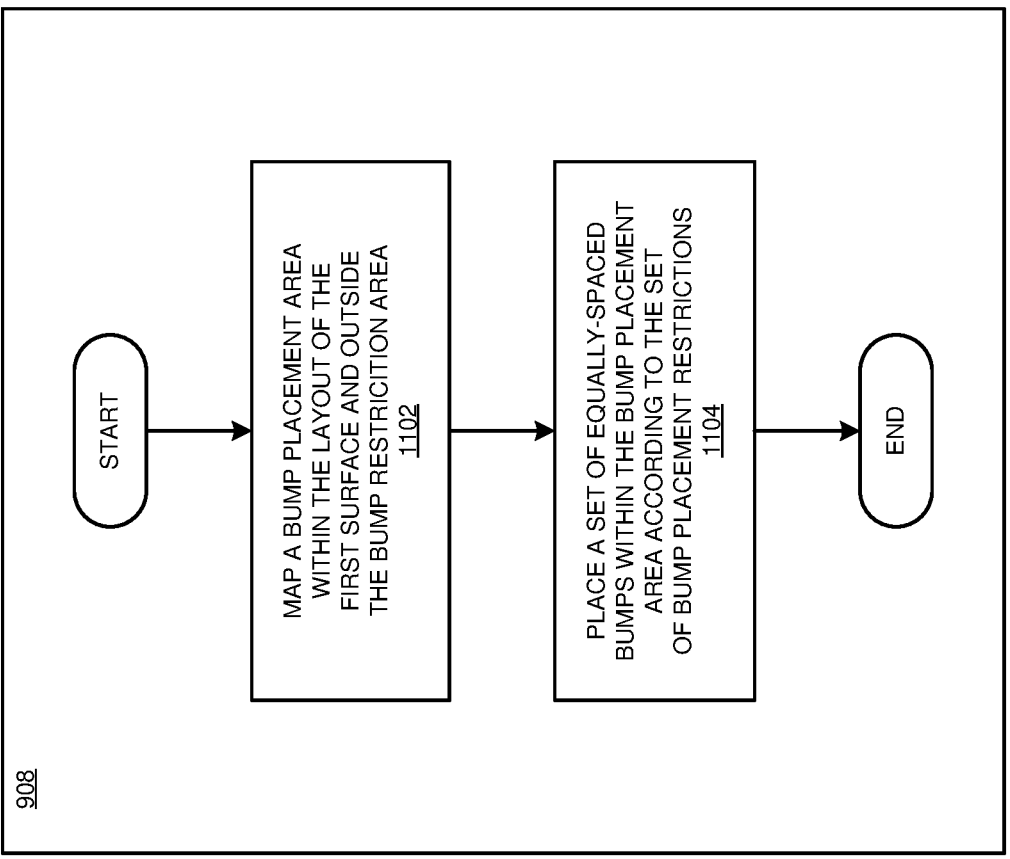
FIG. 11 depicts another flowchart of an example process for bump connection placement in quantum devices in a flip chip configuration in accordance with an illustrative embodiment.

With reference to FIG. 11, this figure depicts another flowchart of an example process for bump connection placement in quantum devices in a flip chip configuration in accordance with an illustrative embodiment. FIG. 11 depicts more detail of another implementation of block 908 in FIG. 9.

In block 1102, the application maps a bump placement area within the layout of the first surface and outside the bump restriction area. In block 1104, the application places a set of equally-spaced bumps within the bump placement area according to the set of bump placement restrictions. Then the application ends.

Thus, a computer implemented method, system or apparatus, and computer program product are provided in the illustrative embodiments for bump connection placement in quantum devices in a flip chip configuration and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
mapping, within a layout of a first surface in a flip chip configuration, a bump restriction area according to a set of bump placement restrictions, wherein a first bump placement restriction specifies an allowed distance range between a bump and a qubit chip element in a layout of the first surface, and wherein a second bump placement restriction specifies an allowed distance range between the bump and a qubit chip element in a layout of a second surface in the flip chip configuration; and
depositing an electrically conductive material, outside the bump restriction area, to form the bump, wherein the bump comprises an electrically conductive structure that electrically couples a signal between the first surface and the second surface and is positioned according to the set of bump placement restrictions.

2. The computer-implemented method of claim 1, further comprising:
placing, within the layout of the first surface according to a bump placement restriction specifying an allowed distance range between a first bump and a second bump in the layout of the first surface, a set of bumps; and
removing, from the layout of the first surface, a bump in the set of bumps that is at least partially within the bump restriction area.

3. The computer-implemented method of claim 1, further comprising:

mapping, within the layout of the first surface, a bump placement area, the bump placement area comprising a portion of the layout of the first surface outside the bump restriction area; and placing, within the bump placement area according to a bump placement restriction specifying an allowed distance range between a first bump and a second bump in the layout of the first surface, a set of bumps.

4. The computer-implemented method of claim 1, further comprising:

checking conformity of the layout of the first surface with a third bump placement restriction and a fourth bump placement restriction, wherein the third bump placement restriction specifies an allowed distance range between a first bump and a second bump in the layout of the first surface, and wherein the fourth bump placement restriction specifies a minimum allowable bump density of a portion of the layout of the first surface; and adjusting, responsive to the checking, a bump density of a portion of the layout of the first surface.

5. The computer-implemented method of claim 4, further comprising:

restoring, as a part of the adjusting, a bump within the portion previously removed for being at least partially within the bump restriction area, the restored bump having an adjusted placement conforming to the first bump placement restriction, the second bump placement restriction, the third bump placement restriction, and the fourth bump placement restriction.

6. The computer-implemented method of claim 4, further comprising:

adding, as a part of the adjusting, a second set of bumps within the portion, the second set of bumps being equally spaced, a placement of each bump in the second set of bumps conforming to the first bump placement restriction, the second bump placement restriction, the third bump placement restriction, and the fourth bump placement restriction.

7. The computer-implemented method of claim 4, further comprising:

changing, as a part of the adjusting, a placement of a bump within the portion, the adjusted bump having a new placement conforming to the first bump placement restriction, the second bump placement restriction, the third bump placement restriction, and the fourth bump placement restriction.

8. The computer-implemented method of claim 4, further comprising:

changing, as a part of the adjusting, a placement of a qubit chip element in the layout of the first surface, the adjusted element having a new placement conforming to the first bump placement restriction, the second bump placement restriction, the third bump placement restriction, and the fourth bump placement restriction.

9. The computer-implemented method of claim 4, further comprising:

adjusting, responsive to the checking determining that a portion of the layout of the first surface has a bump density below the minimum allowable bump density, a placement of a qubit chip element in the layout of the second surface, the adjusted element having a new placement conforming to the first bump placement restriction, the second bump placement restriction, the third bump placement restriction, and the fourth bump placement restriction.

10. A computer usable program product comprising one or more computer-readable storage devices, and program instructions stored on at least one of the one or more storage devices, the stored program instructions comprising:

program instructions to map, within a layout of a first surface in a flip chip configuration, a bump restriction area according to a set of bump placement restrictions, wherein a first bump placement restriction specifies an allowed distance range between a bump and a qubit chip element in a layout of the first surface, and wherein a second bump placement restriction specifies an allowed distance range between the bump and a qubit chip element in a layout of a second surface in the flip chip configuration; and program instructions to deposit an electrically conductive material, outside the bump restriction area, to form the bump, wherein the bump comprises an electrically conductive structure that electrically couples a signal between the first surface and the second surface and is positioned according to the set of bump placement restrictions.

11. The computer usable program product of claim 10, further comprising:

program instructions to place, within the layout of the first surface according to a bump placement restriction specifying an allowed distance range between a first bump and a second bump in the layout of the first surface, a set of bumps; and program instructions to remove, from the layout of the first surface, a bump in the set of bumps that is at least partially within the bump restriction area.

12. The computer usable program product of claim 10, further comprising:

program instructions to map, within the layout of the first surface, a bump placement area, the bump placement area comprising a portion of the layout of the first surface outside the bump restriction area; and program instructions to place, within the bump placement area according to a bump placement restriction specifying an allowed distance range between a first bump and a second bump in the layout of the first surface, a set of bumps.

13. The computer usable program product of claim 10, further comprising:

program instructions to check conformity of the layout of the first surface with a third bump placement restriction and a fourth bump placement restriction, wherein the third bump placement restriction specifies an allowed distance range between a first bump and a second bump in the layout of the first surface, and wherein the fourth bump placement restriction specifies a minimum allowable bump density of a portion of the layout of the first surface; and program instructions to adjust, responsive to the checking, a bump density of a portion of the layout of the first surface.

14. The computer usable program product of claim 13, further comprising:

program instructions to restore, as a part of the adjusting, a bump within the portion previously removed for being at least partially within the bump restriction area, the restored bump having an adjusted placement conforming to the first bump placement restriction, the second bump placement restriction, the third bump placement restriction, and the fourth bump placement restriction.

15. The computer usable program product of claim 13, further comprising:
 program instructions to add, as a part of the adjusting, a second set of bumps within the portion, the second set of bumps being equally spaced, a placement of each bump in the second set of bumps conforming to the first bump placement restriction, the second bump placement restriction, the third bump placement restriction, and the fourth bump placement restriction.

16. The computer usable program product of claim 13, further comprising:
 program instructions to change, as a part of the adjusting, a placement of a bump within the portion, the adjusted bump having a new placement conforming to the first bump placement restriction, the second bump placement restriction, the third bump placement restriction, and the fourth bump placement restriction.

17. The computer usable program product of claim 13, further comprising
 program instructions to change, as a part of the adjusting, a placement of a qubit chip element in the layout of the first surface, the adjusted element having a new placement conforming to the first bump placement restriction, the second bump placement restriction, the third bump placement restriction, and the fourth bump placement restriction.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
 program instructions to map, within a layout of a first surface in a flip chip configuration, a bump restriction area according to a set of bump placement restrictions, wherein a first bump placement restriction specifies an allowed distance range between a bump and a qubit chip element in a layout of the first surface, and wherein a second bump placement restriction specifies an allowed distance range between the bump and a qubit chip element in a layout of a second surface in the flip chip configuration; and
 program instructions to deposit an electrically conductive material, outside the bump restriction area, to form the bump, wherein the bump comprises an electrically conductive structure that electrically couples a signal between the first surface and the second surface and is positioned according to the set of bump placement restrictions.

* * * * *